Patented Aug. 4, 1936

2,049,881

UNITED STATES PATENT OFFICE 2,049,881

MANUFACTURE OF SLAG CEMENT

George Witty, Long Island City, N. Y.

No Drawing. Application September 26, 1935,
Serial No. 42,359

1 Claim. (Cl. 106—24)

My invention has for its object the manufacture, mainly from blast furnace slag or other slags, of a cement which is in quality equal to the best Portland cement or other similar cement, and to provide an advantageous method of manufacturing such cement at minimum cost.

In my method I have eliminated the necessity of calcining the compound in any manner or employing any heating process, excepting that for drying purposes, whereby a consequent saving in expense is obviously obtained without detracting from the character and quality of the product.

The main object of the invention is to provide a slag cement having improved properties such as greater plasticity, increased sand carrying capacity, and higher degree of workability than Portland cement or other similar products, together with high strength, quick setting and hydraulic properties.

My invention consists of a mixture of blast furnace slag, calcium oxide, calcined bauxite, feldspar, calcium chloride and magnesium sulfate. The proportions which I prefer to employ are 100 pounds of granulated black furnace slag, 20 pounds of calcium oxide, 10 pounds of calcined bauxite, 5 pounds of feldspar, 3 pounds of calcium chloride and 2 pounds of magnesium sulfate thoroughly mixed in dry state. The proper proportions of the calcium oxide and the calcined bauxite are dependent upon the chemical character of the particular slag used; which is to be determined by analysis. The whole mixture is then ground to extreme fineness and is then ready to be packed in bags or barrels for market, without calcination or heating whatever.

The calcium chloride and magnesium sulfate may, if desired, be added to the lime oxide and calcined bauxite in an aqueous solution and the resulting mixture dried before incorporating it with the slag and feldspar or it may be added in a dry state to the mixture. If it is desired to use a tube mill, the chemicals may be mixed after the grinding or pulverizing process is complete and the cement is ready to be packed for the market. The presence of calcium chloride and magnesium sulfate renders the resulting cement much stronger and quick setting, and by varying its proportions a cement of any desired quality can be obtained.

While I am aware that the idea of mixing granulated slag with lime to form a cement is not new, and that calcium chloride has been added to ordinary calcined Portland cement, still I am not aware that calcium chloride and magnesium sulfate has been added to slag cement for the purpose and in the manner above described. By the peculiar action of the calcium chloride and magnesium sulfate as set forth I am enabled to produce a quick-setting cement of great strength and high hydraulic properties and obtained mainly from blast furnace slag or other slags without the necessity of calcining or any other application of heat.

Having fully described my invention, what I claim as new and desire to secure by Letters Patent is:—

A slag cement including 100 parts by weight of finely ground mixture of granulated blast furnace slag, 20 parts by weight of calcium oxide, 10 parts by weight of calcined bauxite, 5 parts by weight of feldspar, 3 parts by weight of calcium chloride and 2 parts by weight of magnesium sulfate.

GEORGE WITTY.